United States Patent [19]

Lyons

[11] Patent Number: 4,767,185

[45] Date of Patent: Aug. 30, 1988

[54] ROTATING MULTICOLORED AIR DRIVEN REFLECTOR

[76] Inventor: Terry B. Lyons, P.O Box 99, John Day, Oreg. 97845

[21] Appl. No.: 941,983

[22] Filed: Dec. 15, 1986

[51] Int. Cl.$^4$ .................... G02B 5/12; G09F 11/02
[52] U.S. Cl. .................... 350/99; 350/97; 40/479; 116/DIG. 7
[58] Field of Search ............... 350/97–102, 350/106–109, 6.5–6.7, 637; 40/456, 477, 479; 116/DIG. 7; 368/65, 79, 93

[56] References Cited

U.S. PATENT DOCUMENTS

| 3,578,840 | 5/1971 | Richards | 350/99 |
| 4,003,630 | 1/1977 | Kirk | 350/99 |
| 4,046,098 | 9/1977 | Mancinelli et al. | 116/56 |
| 4,105,286 | 8/1978 | Curran | 350/99 |
| 4,140,363 | 2/1979 | Davis et al. | 350/6.8 |
| 4,204,746 | 5/1980 | Fisher | 350/99 |

FOREIGN PATENT DOCUMENTS 0014986  9/1980  European Pat. Off. .

Primary Examiner—John K. Corbin
Assistant Examiner—Ronald M. Kachmarik
Attorney, Agent, or Firm—Klarquist, Sparkman, Campbell, Leigh & Whinston

[57] ABSTRACT

A rotatable reflector for bicycles has a timer which intermittently completely halts rotation of the reflector in sequential positions in response to rotation of the reflector but independently of angular movement of a bicycle wheel. The reflector displays a changing colored reflective surface above a stationary housing of a contrasting color. The timer is liquid actuated and can be accurately calibrated by varying the viscosity of the liquid in the timer. Timed display of contrasting colored portions of the reflector attracts the attention of passing motorists by displaying a signal which appears to blink and change colors. The period during which each contrasting color is displayed is constant regardless of the velocity of the bicycle or relative wind velocity.

11 Claims, 2 Drawing Sheets

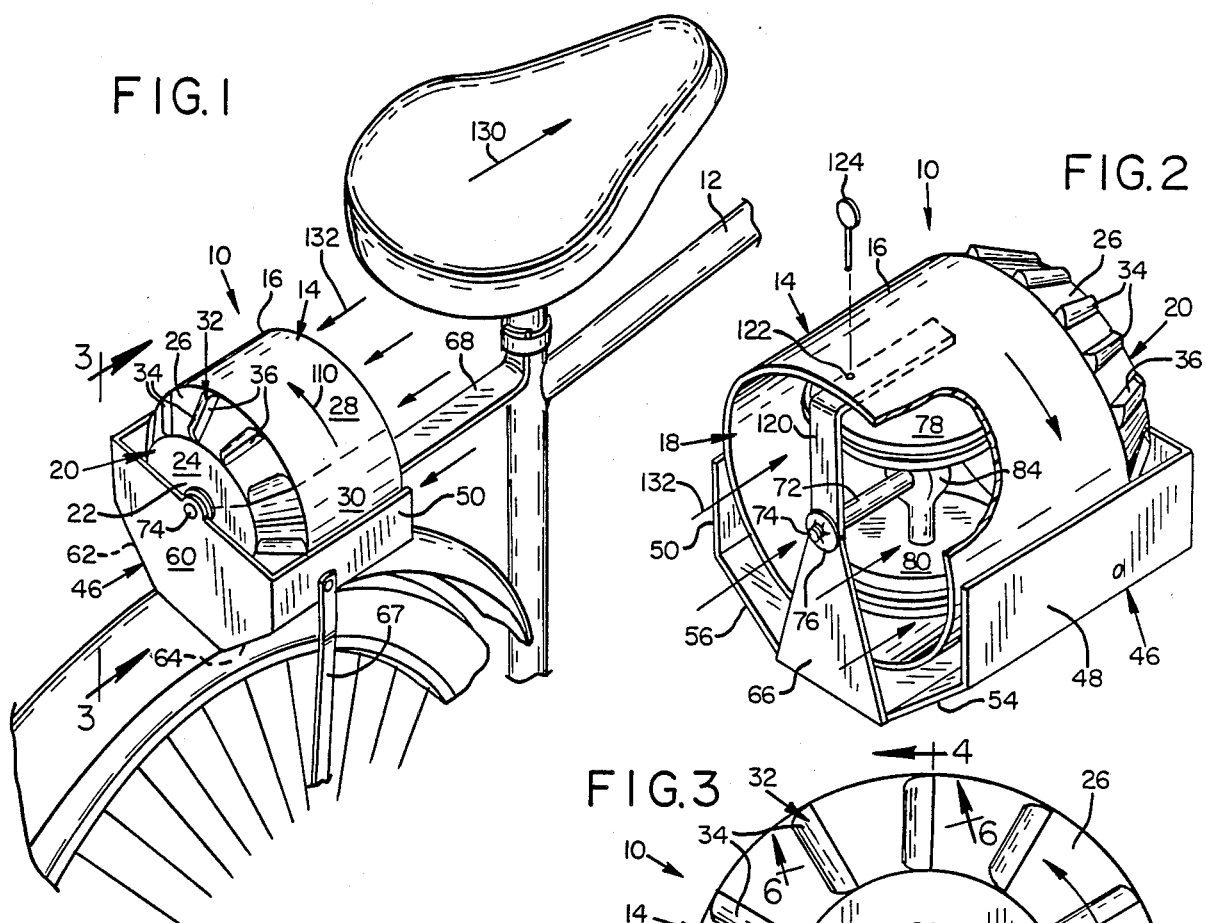

4,767,185

ROTATING MULTICOLORED AIR DRIVEN REFLECTOR

BACKGROUND OF THE INVENTION

1. Field of the Invention

This invention relates generally to a reflector for bicycles and similar vehicles, and particularly to a reflector which displays contrasting reflective colors that appear to be flashing.

2. General Discussion of the Background

Rotating bicycle reflectors have already been disclosed which have a reflecting surface movable with respect to the frame of reference of the bicycle in order to create a flashing effect when the reflecting surface is viewed from a point outside of the frame of reference of the bicycle. For example, U.S. Pat. No. 4,046,098 shows a multisurface reflector which is mounted on a bicycle and connected to a transmission line which moves the reflector assembly in direct response to angular rotation of a bicycle wheel. U.S. Pat. No. 4,105,286 discloses a reflector assembly which is similarly driven by angular rotation of a bicycle wheel or air driven by a fan mechanism that rotates in response to relative air velocity created by movement of the bicycle. U.S. Pat. No. 4,204,746 shows a similar air driven, rotary signal which continuously rotates a reflecting member in response to the relative velocity of air as a bicycle is moving. U.S. Pat. Nos. 3,578,840 and 4,003,630 show reflectors of unusual shapes that are continously rotated in response to relative air currents created by movement of the bicycle.

Some unfortunate drawbacks of many of the aforementioned rotary reflectors are that they continuously rotate and that the speed of their angular rotation is a function of the angular velocity of a bicycle wheel or relative air velocity arising from movement of the bicycle. As the bicycle velocity or relative air velocity increases, angular rotation of the reflector proportionately increases until any contrasting colors on the reflector blur into a single color. The high visibility advantage of a rotating reflector is thereby lost, since the rapidly rotating reflector becomes visibly indistinguishable from a stationary reflector.

European Patent Application No. 014986 recognized this problem and attempted to overcome it by providing a centrifugal brake which slows rotation of a rotating reflector when the reflector rotates faster than a preselected speed. The centrifugal brake never completely halts rotation of the reflector, however, and therefore never transmits a dramatically contrasting signal to oncoming vehicles.

U.S. Pat. No. 4,046,098 interposed a Geneva mechanism in a rotary transmission line to intermittently rotate the bicycle reflector. Rotational velocity of the reflector was nonetheless a function of the rotational velocity of the bicycle wheel, and at very high speeds the reflector would appear to rotate almost continuously. This was especially true since the period during which rotation of the reflector was interrupted grew progressively shorter as angular velocity of the bicycle wheel increased.

It is therefore an object of the present invention to provide a bicycle reflector which maximizes visibility of the reflector to oncoming traffic and other observers.

Yet another object of this invention is to provide such a reflector having a simple mechanism for maintaining visioility of contrasting colored faces of the reflector which are displayed to oncoming vehicles.

It is another object of the present invention to provide a bicycle reflector having a timing mechanism that operates independently of angular rotation of a bicycle wheel.

It is a still further object of the present invention to provide a bicycle reflector which presents minimal air resistance to movement of a bicycle to which it is attached.

These and other objects of the invention will become apparent after reading the following detailed description.

SUMMARY OF THE INVENTION

The foregoing objects are achieved by providing a rotatable reflector assembly with a timer which intermittently completely halts rotation of the reflector in sequential positions in response only to rotation of the reflector and independently of angular movement of the bicycle wheels.

In preferred embodiments, the reflector assembly includes a cylindrical, rotatable reflector having an open face for admitting air to the interior of the reflector, a closed face which forms a reflective surface, and a plurality of air vanes through the closed face for rotating the reflector about an axis through the closed face in response to movement of air through the cylinder. A timer carried by the cylindrical reflector intermittently completely halts rotation of the reflector after each half rotation independently of angular rotation of the wheel as the reflector rotates.

A reflective housing partially encloses the cylindrical reflector such that only a half-cylindrical top portion of the reflector is visible above the housing. Each half-cylindrical portion of the reflector which is visible above the housing is a contrasting color, and the color of the housing itself differs from either half of the cylinder. Each time the cylinder stops rotating, it displays a contrasting color above the housing which is different from the color displayed by the other half of the cylindrical reflector during the last timed delay in rotation. The reflector appears to blink a different color duirng each timed delay, and the period of delay during which each color is displayed is constant.

In preferred embodiments, the timer includes a pair of closed, opposing chambers on either side of the axis about which the reflector rotates. Each chamber is divided by a movable, flexible diaphragm, and a stop pin is carried by each diaphragm such that each stop pin moves with the diaphragm to which the pin is attached. The closed chambers are interconnected by a tube carried by the reflector. A liquid can move through the tube to exert a pressure on one or the other of the movable diaphragms and alternately reciprocate the pins such that one pin is extended while the other is retracted. A pin stop, which is stationary relative to the rotating reflector, is positioned within the cylindrical reflector adjacent the top of the timer to engage a pin when the pin is extended but not when the pin is retracted. Rotation of the reflector is halted after each one-half rotation of the cylindrical reflector, and rotation does not resume until sufficient fluid has passed down through the tube to retract the engaged pin and move it out of engagement with the stop. As the engaged pin retracts, the other pin concomitantly extends in response to movement of liquid moving down through the tube which expands the diaphragm in the bottom chamber. After a one-half rotation of the reflector, the extended pin engages the stop and begins to retract as the nonengaged pin begins to extend. The reflector continues to be intermittently rotated and stopped for a constant period as long as relative air velocity acts on the wind vanes to rotate the reflector.

Liquid moves through the tube of the timer independently of the angular velocity of the bicycle wheels or reflector. The timer's period of delay is a function only of the viscosity of the liquid. The period of delay is therefore constant as bicycle velocity or relative air velocity changes.

BRIEF DESCRIPTION OF THE DRAWINGS

FIG. 1 is a fragmentary, rear perspective view showing a preferred embodiment of a bicycle reflector of the present invention mounted behind the seat and above the fender of a bicycle.

FIG. 2 is a perspective view of the front of the reflector shown in FIG. 1.

FIG. 3 is a view taken along line 3—3 of FIG. 1.

FIG. 4 is a sectional view taken along line 4—4 of FIGS. 3 and 5.

DESCRIPTION OF THE PREFERRED EMBODIMENT

Figure 5:
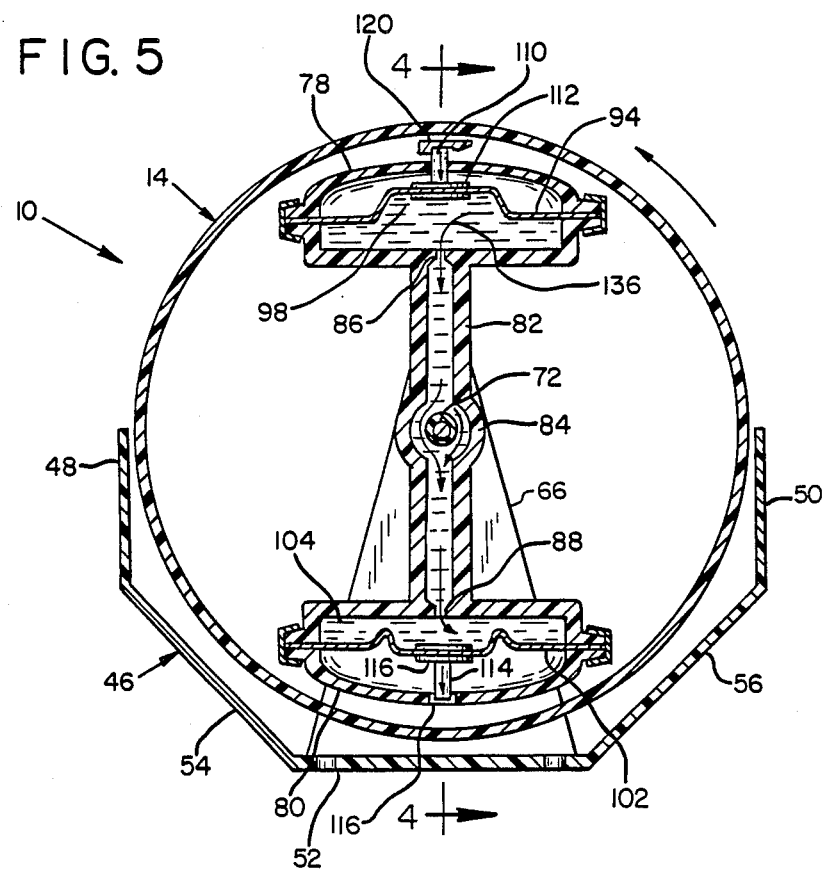
FIG. 5 is a sectional view taken along line 5—5 of FIG. 4.

A rotatable reflector assembly 10 for bicycles and similar vehicles is shown mounted on a rear portion of a conventional bicycle 12. The reflector assembly 10 includes a rotatable reflector 14 having a cylindrical body 16, open end 18, and closed end 20. The closed end forms a frustoconical face 22, which includes a circular flat central portioh 24 circumscribed by a sloping shoulder 26 which connects central portion 24 to cylindrical body 16.

Cylindrical body 16 is divided into semicylindrical halves 28, 30 (FIG. 1). Halves 28, 30 have an exterior surface which is covered with a reflective colored material. The colors of halves 28, 30 are contrasting, for example, half 28 is yellow and half 30 is red.

Figure 6:
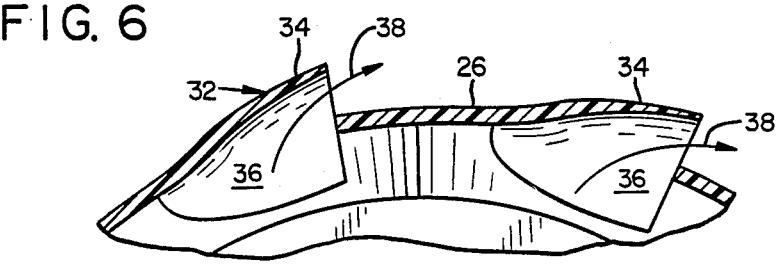
FIG. 6 is a sectional view taken along line 6—6 of FIG. 3.

A rotating means is provided for rotating reflector 14. In the disclosed embodiment, the rotating means includes a plurality of wind vanes 32 through shoulder 26. Each vane 32 includes a punched flap 34 having a top surface which is continuous with the surface of shoulder 26. Each flap 34 is slightly curved as shown in FIG. 6 to help preserve the continuity of the surface of the shoulder 26. Each flap 34 also covers a corresponding cutout portion 36 (FIGS. 1 and 6) through which air can pass in the direction shown by arrows 38 (FIG. 6). The tip of each flap 34 should completely cover its corresponding cutout 36 when viewed from above each flap to prevent interruption of the colored signaling surface.

Reflector 14 is rotatably mounted in a housing 46 which encloses a semicylindrical portion of body 16, the housing 46 being about as high as a radius of cylindrical body 16. The exterior color of housing 46 is preferably blue or any other color that contrasts with the red and yellow colors of semicylindrical portions 28, 30. Housing 46 includes sidewalls 48, 50 and bottom 52 interconnected by sloping walls 54, 56. A rear wall 60 extends across the rear of housing 46. A front face of housing 46 is substantially open, being only partially obscured by an upstanding triangular bracket 66 which extends upwardly from bottom 52. A pair of air ports 62, 64 are provided through sloping walls 54, 56 near rear wall 60 to allow air which enters cylindrical body 16 to leave the reflector body without exerting undue drag on bicycle 12.

Housing 46 can be secured to bicycle 12 above the rear fender of bicycle 12 by a pair of supports 67 (only one being shown in FIG. 1) which extend between sidewalls 48, 50 of housing 46 and the axle (not shown) of the rear wheel. Another support 68 extends between the base of the seat of bicycle 12 and triangular bracket 66 of housing 46. Supports 67, 68 thereby prevent horizontal or vertical displacement of reflector 14 with respect to bicycle 12. It will be apparent that reflector 14 can be attached to bicycle 12 in a variety of positions and in a variety of ways.

An axle 72 (FIGS. 2 and 4) extends between rear wall 60 and triangular bracket 66, the axle being free to rotate with respect to housing 46. Axle 72 is retained in place by an enlarged head 74 (FIGS. 3 and 4) against rear wall 60 and a retainer 76 (FIGS. 2 and 4) against triangular bracket 66.

A timing means is carried by reflector 14 for completely halting rotation of reflector 14 after each one-half rotation of the reflector. The timing means is positioned inside cylindrical body 16 and includes first and second closed, domed chambers 78, 80 positioned in opposing relationship on either side of axle 72. A conduit 82 extends perpendicularly to axle 72 and interconnects the chambers 78, 80. Conduit 82 has an enlarged center section 84 which maintains the internal cross-sectional area of conduit 82 constant around axle 72 to allow an unimpeded flow of a liquid 126 through the conduit while also allowing axle 72 to be inserted through an opening formed by the enlarged center section 84 of conduit 82. Each end of conduit 82 is constricted at 86, 88 for impeding the flow of liquid 126 out of conduit 82 into chambers 78, 80.

A flexible expandable circular diaphragm 94 (FIGS. 4 and 5) divides first chamber 78 into a liquid filled first sector 98 which fluidly communicates with conduit 82, and a dry second sector 100. A second flexible expandable circular diaphragm 102 similarly divides chamber 80 into a liquid filled first sector 104 and a dry sector 106. Each of diaphragms 94, 102 is movable between a constricted position and an expanded position. The first sector 98, 104 of each chamber has a greater volume when its respective diaphragm 94 or 102 is in the expanded position. FIG. 4, for example, shows diaphragm 94 in an expanded position and diaphragm 102 in a restricted position.

A pin 110 is attached to the center of diaphragm 94 by a fastener 112 and the pin projects out of an opening 113 in the domed top of chamber 78. Another pin 114 is attached to the center of diaphragm 102 by a fastener 116, and pin 114 projects out of opening 116 in the domed top of chamber 80. Each of pins 110, 114 moves between a retracted position when the diaphragm which carries the pin is constricted, and an extended position when the diaphragm which carries the pin is expanded. In FIGS. 4 and 5, for example, pin 110 is extended because diaphragm 94 is expanded, while pin 114 is retracted because diaphragm 102 is constricted.

A stationary, L-shaped pin stop 120 (FIGS. 2, 4, and 5) is mounted to bracket 66 at the point at which bracket 66 supports axle 72. Stop 120 extends upwardly from bracket 66 and inwardly into the interior of cylindrical reflector 14 to provide a surface against which each pin 110 or 114 stops when the pin is extended. An upwardly projecting leg of stop 120 extends upwardly from bracket 66 a distance less than the radius of body 16 yet greater than the distance of chambers 78, 80 from axle 72. An inwardly projecting leg of stop 120 extends into reflector 14 a sufficient distance to intersect the path of each pin 110, 114 when either pin is extended. Each of cylindrical body 16 and stop 120 have an alignable hole 122 through which the shank of a lock pin 124 can be placed selectively to prevent rotation of reflector 14.

The timing mechanism is partially filled with liquid 126 which occupies conduit 82 and first sectors 98, 104. A sufficient volume of liquid 126 is provided such that, when the chambers 78, 80 of the timing mechanism are in the up-down orientation shown in FIGS. 4 and 5, the diaphragms are positioned such that pin 110 is extended beyond the domed top of chamber 78 and the other pin 114 is retracted within the domed surface of chamber 80.

Liquid 126 is preferably a nontoxic liquid which has a substantially constant viscosity across a broad range of temperatures such that the timer can be calibrated to completely halt rotation for an invariable period of delay. Mineral oil is a suitable liquid for this purpose. Propylene glycol or other commercial antifreeze preparations satisfy the requirement for substantially constant viscosity across a broad temperature range but suffer from the drawback of being toxic.

In operation, bicycle 12 moves in the direction of arrow 130 (FIG. 1), which creates a relative air velocity in the direction of arrows 132. Air enters open end 18 of cylindrical body 16 to create a slightly higher differential air pressure within body 16 which forces air out of the body through cutout portions 36 of vanes 32. Flaps 34 direct the air at an angle to axle 72, which creates a torque that results in a rotary thrust that rotates reflector 14 about axle 72. Ports 62, 64 allow air to leave housing 46, thereby avoiding a build up of air pressure within the housing which could diminish the differential pressure inside and outside reflector 14.

The operation of the timer is illustrated in FIGS. 4 and 5. Extended pin 110 has lodged against pin stop 120 and halted the air induced rotation of reflector 14 in a position in which only the red semicylindrical portion 28 of reflector 14 is visible above blue housing 46. Immediately after pin 110 has abutted stop 120, liquid 126 begins to move out of first sector 98 of chamber 78 through restriction orifice 86 as shown by arrow 136 (FIG. 5). Liquid drains into conduit 82, through section 84, and into first sector 104 of chamber 80. As liquid moves out of sector 98 and into sector 104, diaphragm 94 of chamber 78 begins to constrict which retracts pin 110 out of abutment with stop 120. Concomitantly, diaphragm 102 of chamber 80 expands to extend pin 114. As soon as pin 110 retracts, the torque induced by movement of air through vanes 32 rotates reflector 14 in the direction of arrow 138 (FIG. 1) until pin 114 lodges against stop 120 after a 180° rotation of reflector 14, at which point only yellow portion 30 of reflector 14 is visible above blue housing 46. Liquid 126 then immediately begins to drain out of chamber 80 through conduit 82 into chamber 78. Diaphragm 102 will accordingly restrict, which retracts pin 114 and allows free rotation of reflector 14 in response to air induced torque. This sequence repeats each one-half rotation of the reflector.

Reflector assembly 10 very effectively attracts the attention of passing motorists because it displays a signal which appears to blink and change colors. The timer operates independently of angular rotation of the bicycle wheel or relative wind velocity through the reflector. The timer can be accurately calibrated to achieve a constant period of delay by choosing liquids of various viscosities for the timer. The period during which no rotation occurs will be solely a function of the viscosity of the liquid chosen, since the liquid's viscosity determines how quickly it will flow through conduit 82 and move diaphragms 94, 102.

Having illustrated and described the principles of the invention in a preferred embodiment, it should be apparent to those skilled in the art that the invention can be modified in arrangement and detail without departing from such principles.

I claim all modifications coming within the spirit and scope of the following claims.

1. A rotatable reflector assembly for bicycles and similar vehicle having at least one wheel comprising:
   a rotatable reflector adapted for mounting to said wheeled vehicle;
   rotating means for rotating said reflector; and
   timing means for intermittently completely halting rotation of said reflector in a plurality of sequential positions in response to rotation of said reflector and independently of angular movement of said wheel.

2. A rotatable reflector assembly for bicycles and similar vehicle having at least one wheel comprising:
   a rotatable reflector adapted for mounting to said wheeled vehicle;
   rotating means for rotating said reflector;
   timing means for intermittently completely halting rotation of said reflector in a plurality of sequential positions in response to rotation of said reflector and independently of angular movement of said wheel; and
   said rotating means comprising air driven means for rotating said reflector.

3. The reflector assembly of claim 2 wherein said reflector comprises a reflector face which is rotated about an axis perpendicular to said face, said reflector face comprising first and second contrasting halves, and said timing means further comprising means for halting rotation of said face after each half revolution of said face.

4. The reflector assembly of claim 2 wherein said reflector comprises a face divided into different colored portions, said reflector rotating within a housing which at least partially encloses and obscures said reflector face, and said timing means further comprises means for displaying a single colored portion outside of said housing each time said rotation is completely halted.

5. The reflector assembly of claim 4 wherein said housing comprises a reflective material of a color different than said colored portions of said reflector face.

6. The reflector assembly of claim 2 wherein said timing means comprises:
   first and second stop pins carried by said rotatable reflector, each of said pins being reciprocal between an extended and a retracted position;
   stationary pin-engaging means positioned for engaging a pin when it is extended but not when it is retracted; and
   fluid communication means having interconnected first and second chambers adjacent respectively the first and second stop pins and having fluid therein responsive to gravity for concomitantly moving said first chamber to retract said first pin and said second chamber to extend said second pin, and later concomitantly moving said first chamber to extend said first pin and said second chamber to retract said second pin after partial rotation of said reflector.

7. The reflector assembly of claim 2 wherein said reflector comprises a reflector face which rotates about an axis through said face, and said timing means comprises:

first and second chambers in opposing relationship on either side of said axis;
fluid communication means interconnecting said first and second chambers;
a flexible diaphragm in each of said first and second chambers, each diaphragm dividing each chamber into a first sector communicating with said fluid communication means and a second sector which does not fluidly communicate with said fluid communication means, each of said diaphragms being movable between a constricted position and an expanded position in response to differential pressure in said first and second sectors;
a pin carried by each of said diaphragms and extending out of each of said chambers such that movement of each said diaphragm moves said pin carried thereby between a retracted position when said diaphragm is in said constricted position and an extended position when said diaphragm is in said expanded position;
stationary pin engaging means for engaging a pin when it is extended but not when it is retracted; and
a liquid means in said fluid communication means and first sectors for moving through said fluid communication means in response to gravity and concomitantly displacing a first of said diaphragms to said constricted position and a second of said diaphragms to said expanded position, or concomitantly displacing said first diaphragm to said expanded position and a second of said diaphragms to said restricted position.

8. The reflector assembly of claim 2 wherein said reflector assembly further comprises a stationary reflector housing for said rotatable reflector, and wherein said rotatable reflector comprises a cylindrical body having a reflective sidewall, an open end and a closed end, said closed end forming a frustoconical reflective face having a sloping shoulder with wind vanes therein, said face continuous with said sidewalls, said rotatable reflector being rotatably mounted withing said housing such that said reflective face and sidewall are partially obscured by said housing.

9. The reflector assembly of claim 8 wherein said rotatable reflector comprises a half cylindrical first half and a half cylindrical second half, the reflective surface of each said half being a different color, and wherein said housing encloses one of said cylindrical halves but not the other half at each sequential position at which rotation halts.

10. The reflector assembly of claim 9 wherein said frustoconical reflective face comprises a circular flat central portion circumscribed by a sloping shoulder, and wherein said rotating means comprises wind vanes though said shoulder.

11. A rotatable reflector assembly for bicycles, comprising:

a rotatable reflector comprising a cylindrical body having a reflective sidewall, an open end and a closed end, said closed end forming a frustoconical reflective face which includes a circular flat central portion circumscribed by a sloping shoulder with wind vanes therein, which shoulder connected said central portion to said cylindrical body, said reflector further comprising differently colored first and second semicylindrical portions;
a housing in which said reflector is rotatably mounted for rotation about an axis perpendicular to said reflective face, said housing enclosing a semicylindrical portion of said reflector;
a timing means carried within said cylindrical reflector for completely halting rotation of said reflector after a one-half rotation of said cylindrical body, said timing means comprising:
first and second closed chambers positioned in opposing relationship on either side of said central axis;
a fluid conduit extending perpendicularly through said central axis and interconnecting said first and second chambers;
restriction means in said conduit for impeding flow of a liquid therethrough;
a flexible diaphragm in each of said first and second chambers, each diaphragm dividing the chamber into a first section which fluidly communicates with said fluid conduit and a second sector which does not fluidly communicate with said fluid conduit, each of said diaphragms being movable between a constricted position and an expanded position, said first sector being of a greater volume when said diaphragm is in said expanded position than when said diaphragm is in said constricted position;
a pin carried by each of said diaphragms and extending out of each of said chambers such that movement of said diaphragms moves each of said pins between a retracted position when said diaphragm which carries said pin is in said constricted position and an extended position when said diaphragm which carries said pin is in said expanded position;
stationary pin engaging means for engaging a pin when it is extended by not when it is retracted; and
a liquid means in said fluid conduit which is movable through said conduit and restriction means in response to gravity for concomitantly moving a first of said diaphragm to said constricted position and a second of said diaphragms to said expanded position, and alternatively concomitantly moving said first diaphragm to said expanded position and a second of said diaphragms to said restricted position as said reflector rotates.

* * * * *

UNITED STATES PATENT AND TRADEMARK OFFICE
CERTIFICATE OF CORRECTION

PATENT NO. : 4,767,185
DATED : August 30, 1988
INVENTOR(S) : Terry B. Lyons

It is certified that error appears in the above-identified patent and that said Letters Patent is hereby corrected as shown below:

```
Column 1, line 29, before "reflectors" insert --air driven--.
Column 2, line 1, "visioility" should be --visibility--.
Column 3, line 36, after "end" insert --20--.
Column 3, line 37, "portioh" should be --portion--.
Column 7, line 50, "withing" should be --within--.
Column 8, line 10, "connected" should be --connects--.
Column 8, line 32, "section" should be --sector--.
Column 8, line 50, "by" should be --but--.
Column 8, line 55, "diaphragm" should be --diaphragms--.
```

Signed and Sealed this

Seventeenth Day of January, 1989

Attest:

DONALD J. QUIGG

*Attesting Officer*  *Commissioner of Patents and Trademarks*